Aug. 9, 1938. J. G. BEGLEY 2,126,443
EXERCISE DEVICE
Filed July 13, 1935
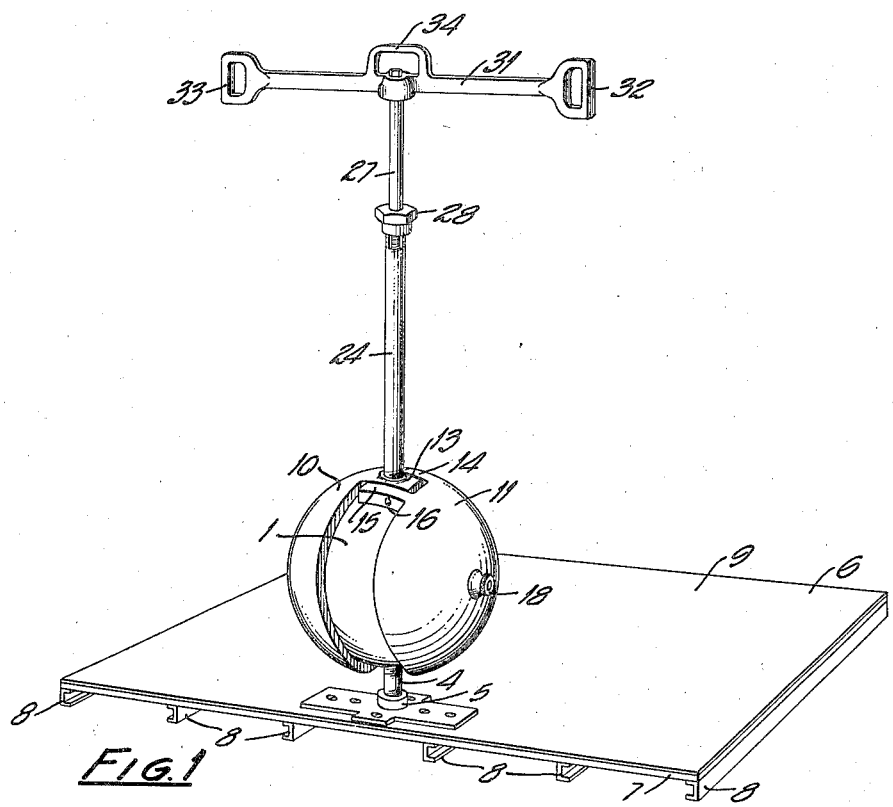
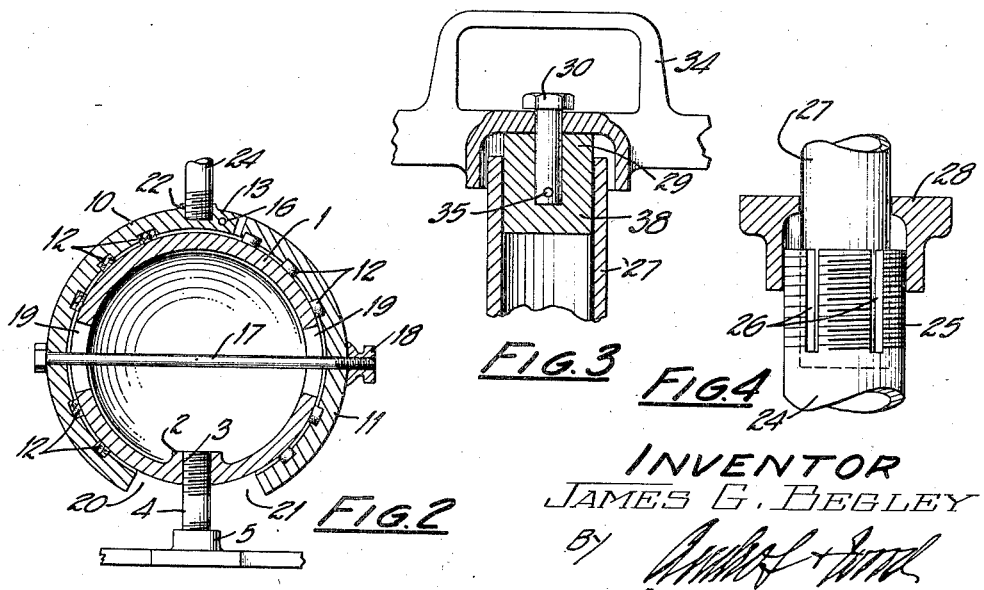
INVENTOR
JAMES G. BEGLEY
BY
ATTORNEYS Patented Aug. 9, 1938

2,126,443

UNITED STATES PATENT OFFICE 2,126,443

EXERCISE DEVICE

James G. Begley, Albany, N. Y.

Application July 13, 1935, Serial No. 31,206

2 Claims. (Cl. 272—60)

My invention relates to exercisers and particularly to a device of this character adapted to be grasped with either one or both hands and which is capable of being pushed or pulled in substantially any direction.

The objects of my invention are to provide a device of this character which will be of relatively simple construction and which will offer substantially uniform resistance to movement in any direction. A further object is to provide a device of this character in which the resistance to movement may be adjusted to individual needs.

With these and other objects in view my invention includes the novel elements and the combinations and arrangements thereof described below and illustrated in the accompanying drawing in which—

Fig. 1 is a perspective view of my device;

Fig. 2 is a fragmentary vertical sectional view of the friction elements; and

Figs. 3 and 4 are fragmentary sectional details.

Referring to the drawing, 1 represents a ball, which may be about 9 inches in diameter, preferably hollow, and made of a metal such as aluminum. At the bottom, the ball is provided with an internal boss 2 surrounding an opening 3 into which is threaded the pipe 4. This pipe may be about 1¼ inches in diameter, and at its lower end is threaded into a floor flange 5. While this flange may be attached to any floor, I have, in Fig. 1, shown it attached to a platform 6. This platform may consist of a metal plate 7 spot welded or otherwise secured to channel members 8. Cemented or otherwise secured to the top of the metal plate 7 is a felt pad 9 upon which the person operating the exerciser stands.

Surrounding the ball 1 are two substantially hemispherical elements 10 and 11 which may be about ½ inch in thickness and which on their interior are provided with a plurality of friction plugs 12 preferably of wood. The element 10, at the top, is provided with a tongue 13 and the other element 11 is provided with two complementary tongues 14 and 15 lying at either side of the tongue 13. A pin 16 is driven through the tongue assembly and forms a connecting hinge for the elements 10 and 11. Extending through both of the elements 10 and 11 and through the ball 1 is a bolt 17 provided with a nut 18 which may be tightened or loosened to vary the friction between the plugs 12 and the ball 1. In order to provide a rather substantial movement of the elements 10 and 11 with respect to the ball the openings 19 in the ball and through which the bolt passes are made of comparatively large size. Substantial clearance spaces 20 and 21 are also provided at the bottom between the pipe 4 and the elements 10 and 11.

The top of the tongue 13 is provided with an opening 22 into which is threaded the pipe 24. The upper end of the pipe 24 is threaded as shown at 25 in Fig. 4 and is also slotted vertically as at 26. Telescoping within the pipe 25 is a pipe 27 which is clamped in adjusted relation thereto by means of the clamping nut 28. Secured in the top of the pipe 27 is a plug 30 which preferably extends somewhat above the end of the pipe as shown at 29. Pivotally secured to the plug 30 by means of the stud 30 is an element 31 provided at its extremities with hand grips 32 and 33 and at its center with a single hand grip 34. It is to be understood that this element 31 may be freely turned in any direction around the stud 30 and that the stud 30 may be threaded in the plug or secured therein by means of a pin 35, as shown.

In operation, the person taking the exercise stands upon the platform and grips the element 31 with one or both hands and moves the elements 10 and 11 relatively to the ball. The forward and back movement, when the parts are assembled in the position shown in Fig. 1, is substantially 180°, while the movement at right angles thereto is somewhat more limited. However, if desired, the ball may be turned 90° from the position shown in Fig. 1 so that the 180° movement will be in a direction 90° from that illustrated.

While I have described my invention in its preferred embodiment, it is to be understood that the words which I have used are words of description rather than of limitation. Hence, changes within the purview of the appended claims may be made without departing from the true scope and spirit of my invention.

What I claim is:

1. An exercising device comprising a platform, a ball immovably secured to said platform in spaced relation thereto, a pair of hollow, approximately hemispherical elements hingedly connected together and secured about said ball in adjustable frictional engagement therewith by a bolt extending through said ball in spaced relation thereto, whereby substantial movement of said hemispherical elements relative to said ball is permitted, and a T-shaped handle connected at its base to said elements near their zone of connection and adapted to be grasped by both hands of the operator; the top of said handle being rotatable whereby the operator may vary the direction in which he applies force thereto.

2. An exercising device comprising a sphere, a support for said sphere adapted to be secured to a floor and to support said sphere in fixed, spaced relation to said floor, a pair of hollow, approximately hemispherical elements hingedly connected together, means securing said elements about said sphere in frictional engagement therewith including means for adjusting said frictional engagement, and a T-shaped handle connected at its base to one of said elements and adapted to be grasped by both hands of the operator.

JAMES G. BEGLEY.